(12) United States Patent
Sekizawa (10) Patent No.: US 9,612,701 B2
(45) Date of Patent: Apr. 4, 2017

(54) TOUCH PANEL

(75) Inventor: Mitsuhiro Sekizawa, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 164 days.

(21) Appl. No.: 13/330,853

(22) Filed: Dec. 20, 2011

(65) Prior Publication Data

US 2012/0169658 A1    Jul. 5, 2012

(30) Foreign Application Priority Data

Jan. 4, 2011    (JP) ................ 2011-000163

(51) Int. Cl.
G06F 3/046    (2006.01)
G06F 3/045    (2006.01)
G06F 3/041    (2006.01)

(52) U.S. Cl.
CPC .............. *G06F 3/045* (2013.01); *G06F 3/041* (2013.01)

(58) Field of Classification Search
CPC ........... G06F 3/045; G06F 2203/04113; G06F 3/041; G06F 3/044; G06F 3/0414; G06F 1/1626; G06F 3/0488; G06F 1/182; G02F 1/13338
USPC .................................. 345/173, 174
See application file for complete search history.

(56) References Cited

U.S. PATENT DOCUMENTS

| | | | |
|---|---|---|---|
| 2001/0040733 A1* | 11/2001 | Toyoshima et al. .......... 359/585 |
| 2003/0011575 A1* | 1/2003 | Matsuda et al. .............. 345/173 |
| 2004/0080490 A1* | 4/2004 | Motoyama et al. .......... 345/156 |
| 2004/0178006 A1* | 9/2004 | Cok ........................ G06F 3/045 178/18.01 |
| 2005/0012644 A1* | 1/2005 | Hurst .................... G06F 3/0488 341/33 |
| 2005/0017956 A1* | 1/2005 | Mai .............................. 345/173 |
| 2005/0110772 A1* | 5/2005 | Kong et al. .................. 345/174 |
| 2005/0118922 A1 | 6/2005 | Endo |
| 2005/0237439 A1* | 10/2005 | Mai ........................ G06F 3/045 349/12 |
| 2006/0274048 A1* | 12/2006 | Spath et al. .................. 345/173 |
| 2007/0181456 A1 | 8/2007 | Kusuda et al. |
| 2009/0243817 A1* | 10/2009 | Son ............................ 340/407.2 |
| 2010/0214263 A1* | 8/2010 | Yeh ........................ G06F 3/045 345/174 |
| 2010/0231422 A1 | 9/2010 | Inaba et al. |

(Continued)

FOREIGN PATENT DOCUMENTS

JP    2002-157086    5/2002
JP    2002-287882    10/2002

(Continued)

*Primary Examiner* — Nalini Mummalaneni
*Assistant Examiner* — Robert Michaud
(74) *Attorney, Agent, or Firm* — IPUSA, PLLC (57) ABSTRACT

A touch panel includes an upper electrode substrate having an upper conductive film formed thereon, a lower electrode substrate having a lower conductive film formed thereon, the upper conductive film and the lower conductive film being arranged to face each other, a spacer disposed between the upper electrode substrate and the lower electrode substrate along four sides of the upper electrode substrate and the lower electrode substrate, and at least one conductive part having a predetermined height and disposed in a vicinity of the spacer on an inner side thereof on at least one of the lower conductive film and the upper conductive film.

2 Claims, 7 Drawing Sheets

(56) References Cited

U.S. PATENT DOCUMENTS

2010/0309152 A1* 12/2010 Kusuda .............. G02F 1/13338
                                                     345/173
2011/0175845 A1*  7/2011 Honda .................... G06F 3/044
                                                     345/174

FOREIGN PATENT DOCUMENTS

| | | |
|---|---|---|
| JP | 2003-122482 | 4/2003 |
| JP | 2004-272722 | 9/2004 |
| JP | 2005-182737 | 7/2005 |
| JP | 2005182737 A * | 7/2005 |
| JP | 2008-046817 | 2/2008 |
| JP | 2008-293129 | 12/2008 |
| JP | 2010-079781 | 4/2010 |
| JP | 2010079781 A * | 4/2010 |
| JP | 2010-218136 | 9/2010 |
| WO | 2005/064451 | 7/2005 |
| WO | WO 2008047971 A1 * | 4/2008 |

* cited by examiner

TOUCH PANEL

BACKGROUND OF THE INVENTION

1. Field of the Invention

The disclosures herein relate to a touch panel.

2. Description of the Related Art

A touch panel is an input device that allows input to be directly entered into a display, and is placed in front of the display. Touch panels are widely used in various applications because of their capacity of allowing direct inputting based on visual information provided by the display.

A resistive-type touch panel is widely known in the art. The resistive-type touch panel includes an upper electrode substrate and a lower electrode substrate having respective transparent conductive films. These substrates are arranged such that the corresponding transparent conductive films face each other. When pressure is applied to a point on the upper electrode substrate, the transparent conductive films are brought into contact with each other, thereby allowing the position of the pressed point to be detected.

The resistive-type touch panel is classified into a four-wire type and a five-wire type. In the four-wire type, an X-axis electrode is disposed on one of the upper electrode substrate and the lower electrode substrate, and a Y-axis electrode is disposed on the other substrate. In the five-wire type, an X-axis electrode and a Y-axis electrode are both disposed on the lower electrode substrate while the upper electrode substrate serves as a probe for detecting voltage (see Japanese Patent Application Publication No. 2004-272722 and Japanese Patent Application Publication No. 2008-293129, for example).

Figure 1:
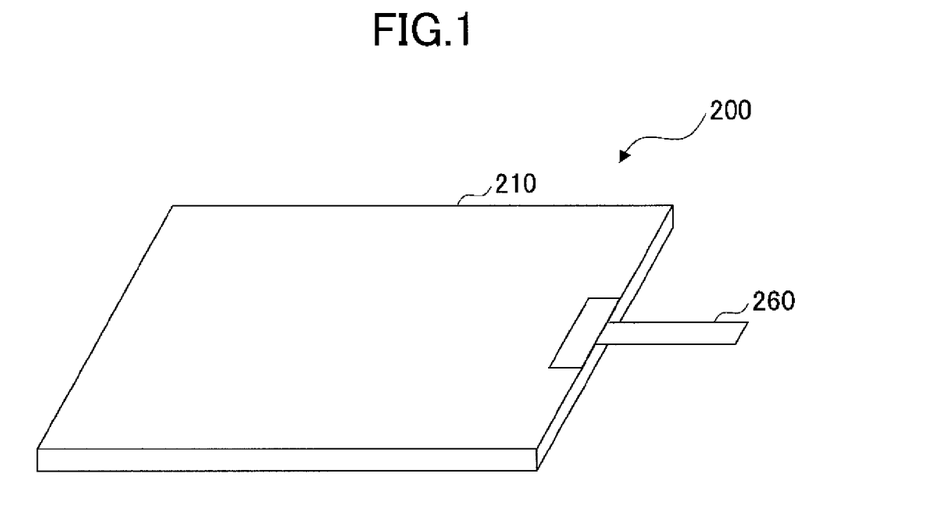
FIG. 1 is an oblique perspective view of a touch panel.
Figure 2:
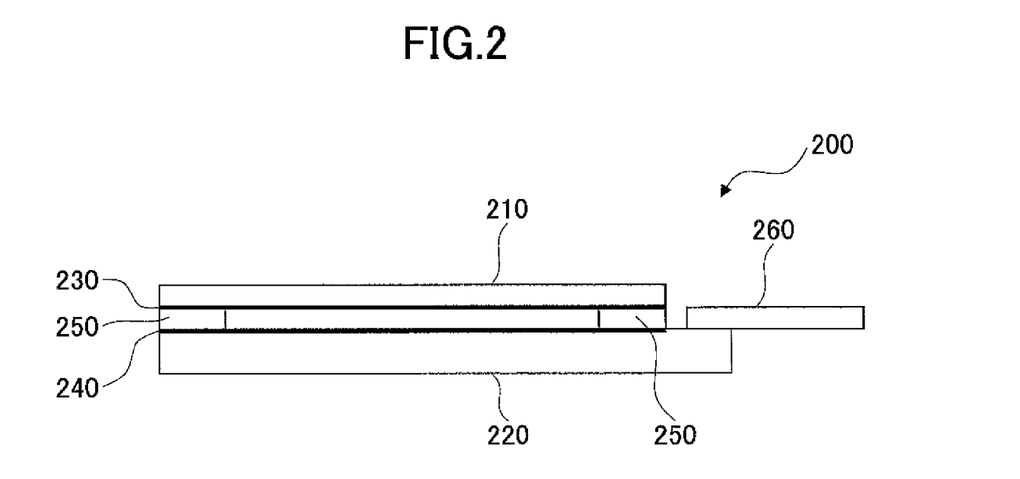
FIG. 2 is a schematic view illustrating a cross section of the touch panel.

In the following, a description will be given of a five-wire-type touch panel by referring to FIG. 1 and FIG. 2. FIG. 1 is an oblique perspective view of a five-wire-type touch panel. FIG. 2 is a schematic view illustrating a cross section of the five-wire-type touch panel.

A five-wire-type touch panel 200 includes an upper electrode substrate 210 formed of a film having a transparent conductive film 230 formed on a surface thereof, and further includes a lower electrode substrate 220 formed of glass having a transparent conductive film 240 formed on a surface thereof. The upper electrode substrate 210 and the lower electrode substrate 220 are arranged with spacer 250 intervening therebetween such that the transparent conductive film 230 and the transparent conductive film 240 face each other. The five-wire-type touch panel 200 is electrically coupled to a host computer (not shown) through a cable 260.

In the touch panel as described above, information is entered through the event that the transparent conductive film 230 of the upper electrode substrate 210 comes in contact with the transparent conductive film 240 of the lower electrode substrate 220. There may be a case, however, in which the transparent conductive film 230 and the transparent conductive film 240 fail to come in contact with each other when the touch panel is pressed at a point close to the spacer 250 with the same amount of force that may be used when pressing the touch panel around the center thereof. In the touch panel, the transparent conductive film 230 and the transparent conductive film 240 come in contact with each other when the film constituting the upper electrode substrate 210 is warped upon being pressed by a finger or the like. However, constant interval between the substrates is maintained by the spacer 250 in the vicinity of peripheral edges where the spacer 250 is provided. Because of this, a larger degree of warping than in the center area is required at the periphery of the touch panel in order to bring the transparent conductive film 230 and the transparent conductive film 240 in contact with each other.

Figure 3:
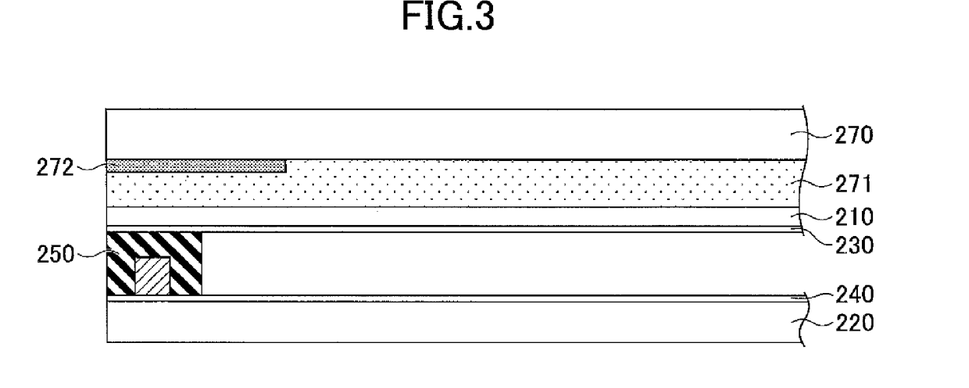
FIG. 3 is an illustrative drawing of a related-art touch panel.

A decorative film may be attached to the upper electrode substrate 210, which makes the upper electrode substrate 210 more difficult to warp. The trend to use such a decorative film is gathering momentum. As illustrated in FIG. 3, a decorative film 270 is attached to the upper electrode substrate 210 through an adhesive layer 271 made of acrylic resin or the like. An integrated structure including the decorative film 270, the adhesive layer 271, and the upper electrode substrate 210 needs to be warped by a finger press. However, this integrated structure is thick and hard to bend. Especially in the vicinity of the spacers 250 (i.e., positions near the places where the spacer 250 is provided), an extremely strong force may be required to bring the transparent conductive film 230 and the transparent conductive film 240 into contact with each other.

In this manner, a pressing force required to bring the transparent conductive film 230 and the transparent conductive film 240 into contact with each other may vary between the central area of the touch panel and the peripheral area thereof. As a result, information may not be entered in the vicinity of the peripheral edges of the touch panel if the same amount of force that is used to press the center area of the touch panel with a finger to enter information is used in the peripheral area. Such area-dependent variation in the amount of force required to press the touch panel to enter information may result in information failing to be properly entered with sufficient accuracy. The entirety of the decorative film 270 is formed of a transparent resin material such as PET (polyethylene terephthalate) or the like. Further, a black decorative area 272 is provided for the purpose of concealing the spacer 250 at each of the four edges of the touch panel.

Accordingly, there may be a need for a touch panel in which an electrode-to-electrode contact is made in the vicinity of peripheral edges of the touch panel where a spacer is provided, despite the use of the same amount of force that is used in the central area of the touch panel, thereby allowing information to be entered by the same force across the entire screen.

SUMMARY OF THE INVENTION

It is a general object of the present invention to provide a touch panel that substantially obviates one or more problems caused by limitations and disadvantages of the related art.

According to one embodiment, a touch panel includes an upper electrode substrate having an upper conductive film formed thereon, a lower electrode substrate having a lower conductive film formed thereon, the upper conductive film and the lower conductive film being arranged to face each other, a spacer disposed between the upper electrode substrate and the lower electrode substrate along four sides of the upper electrode substrate and the lower electrode substrate, and at least one conductive part having a predetermined height and disposed in a vicinity of the spacer on an inner side thereof on at least one of the lower conductive film and the upper conductive film.

According to another embodiment, a touch panel includes an upper electrode substrate having an upper conductive film formed thereon, a lower electrode substrate having a lower conductive film formed thereon, the upper conductive film and the lower conductive film being arranged to face each other, a spacer disposed between the upper electrode substrate and the lower electrode substrate along four sides of the upper electrode substrate and the lower electrode substrate, and a conductive part having a predetermined height disposed along four sides of the upper conductive film, the conductive part being connected to the spacer, and the spacer being disposed within an area that is covered by the conductive part.

According to at least one embodiment, a touch panel is provided in which an electrode-to-electrode contact is made in the vicinity of peripheral edges of the touch panel where a spacer is provided, despite the use of the same amount of force that is used in the central area of the touch panel, thereby allowing information to be entered by the same force across the entire screen.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments will be described by referring to the accompanying drawings. The same elements throughout the drawings are referred to by the same numerals, and a description thereof will be omitted.

[First Embodiment]
<Touch Panel>

Figure 4:
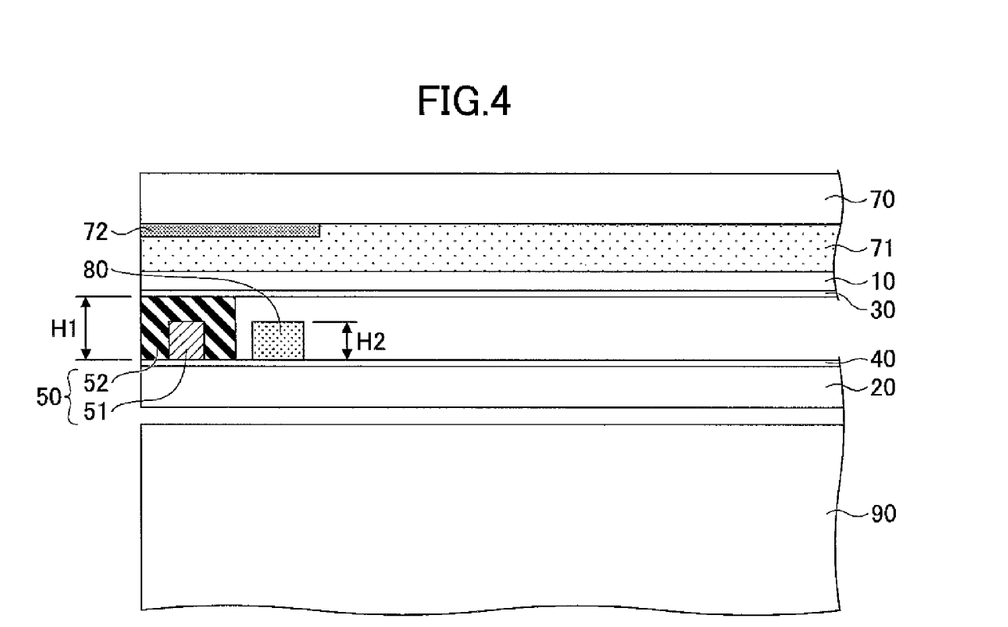
FIG. 4 is a drawing illustrating the structure of a touch panel according to a first embodiment.

In the following, a description will be given of a touch panel according to a first embodiment. As illustrated in FIG. 4, the touch panel according to the first embodiment includes an upper electrode substrate 10 formed of a film or the like having a transparent conductive film 30 serving as an upper conductive film formed on a surface thereof, and further includes a lower electrode substrate 20 formed of glass or the like having a transparent conductive film 40 serving as a lower conductive film formed on a surface thereof. The upper electrode substrate 10 and the lower electrode substrate 20 are arranged with an intervening spacer 50 placed therebetween such that the transparent conductive film 30 and the transparent conductive film 40 face each other. A decorative film 70 is attached to the upper electrode substrate 10 through an adhesive layer 71 made of acrylic resin or the like. The decorative film 70 is formed of a transparent resin material such as PET or the like. Further, a black decorative area 72 having a predetermined width is provided along the four sides (i.e., edges) of the touch panel. The decorative area 72 is provided for the purpose of concealing the spacer 50, and is made of a black-color material or the like. The spacer 50 includes a conductive core 51 inside thereof, and also includes an insulating part 52 on the exterior thereof to cover the conductive core 51. As illustrated in FIG. 4, the touch panel of the present embodiment may be placed on a display apparatus 90 such as a liquid crystal display or the like, so that the touch panel may be used in conjunction with items displayed on the display apparatus 90.

In the touch panel of the present embodiment, the spacer 50 may have a height H1 of 25 micrometers to 200 micrometers. Further, a conductive part 80 formed of a conductive material such as metal or the like is disposed at a distance of 1 mm, for example, from the edge of the spacer 50 inside the touch panel. The conductive part 80 may have a height H2 that is larger than or equal to 50% of H1 and smaller than or equal to 80% of H1 The height H2 may be in a range of 12.5 micrometers to 160 micrometers, for example. The provision of the conductive part 80 in the vicinity of the spacer 50 makes it possible for the transparent conductive film 30 and the transparent conductive film 40 to be electrically connected to each other through the conductive part 80 despite a small amount of warp of the upper electrode substrate 10. An increase in the height H2 of the conductive part 80 makes it easier for the transparent conductive film 30 to come in contact with the conductive part 80 despite a small force. However, too short a gap between the conductive part 80 and the transparent conductive film 30 may generate electric discharge or the like when voltage is applied. When the voltage between the conductive part 80 and the transparent conductive film 30 is 25 V, for example, a gap shorter than 10 micrometers may result in the occurrence of electric discharge. Accordingly, a condition of H1–H2>10 micrometers is preferable. The conductive part 80 may be formed by printing with metal paste such as silver paste, by adhering a conductive film, or by coating with a conductive material.

Figure 5:
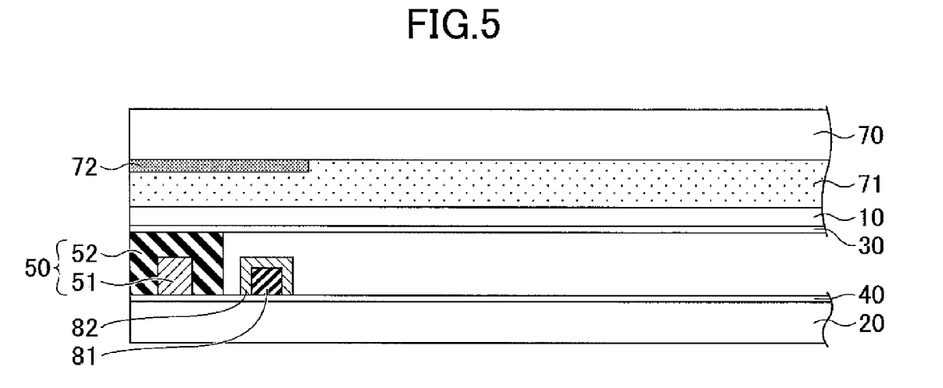
FIG. 5 is a drawing illustrating the structure of another touch panel according to the first embodiment.

There is no need for the entirety of the conductive part 80 to be made of conductive material such as metal. As illustrated in FIG. 5, an insulating part 81 may be formed on the transparent conductive film 40 of the lower electrode substrate 20, with a metal layer 82 covering the surfaces of the insulating part 81.

Figure 6:
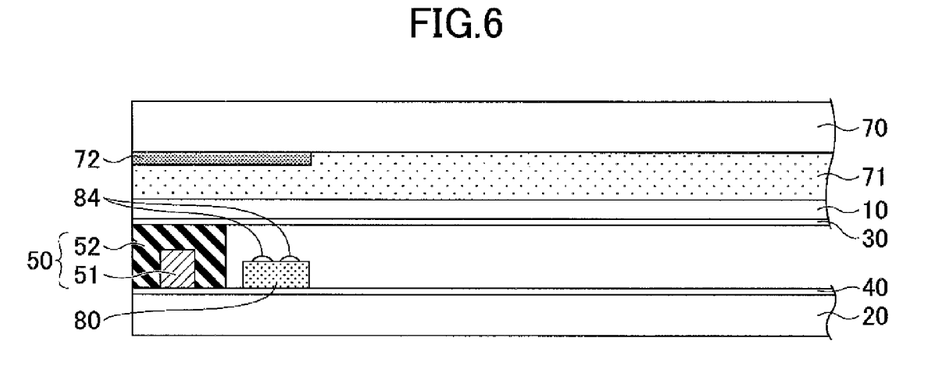
FIG. 6 is a drawing illustrating the structure of yet another touch panel according to the first embodiment.
Figure 7:
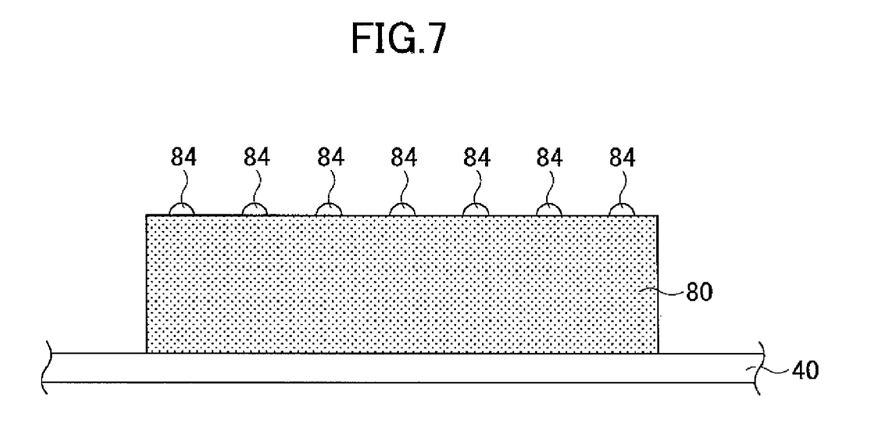
FIG. 7 is an illustrative drawing of a dot pattern.

Alternatively, as illustrated in FIG. 6 and FIG. 7, a dot pattern 84 made of insulating material may be formed on the upper surface of the conductive part 80 that is made of conductive material such as metal. The provision of the dot pattern 84 prevents the transparent conductive film of the upper electrode substrate 10 from being unintentionally brought in contact with the conductive part 80. FIG. 7 is an enlarged view of the conductive part 80 illustrated in FIG. 6.

Figure 8:
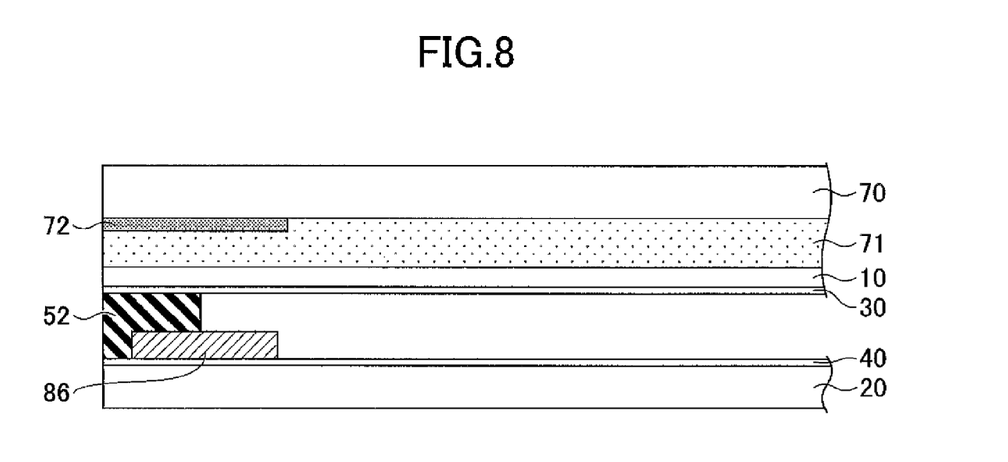
FIG. 8 is a drawing illustrating the structure of still another touch panel according to the first embodiment.

As illustrated in FIG. 8, the conductive core 51 and the conductive part 80 may be integrated into a unitary structure as a conductive part 86.

Figure 9:
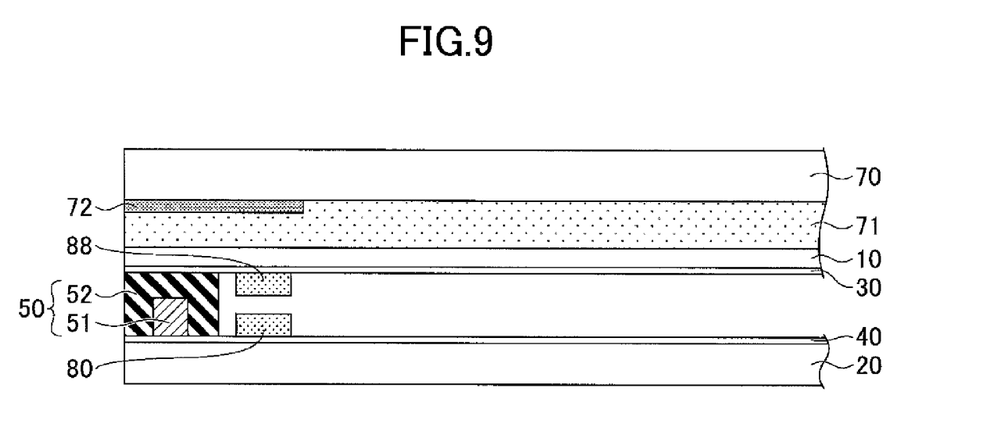
FIG. 9 is a drawing illustrating the structure of further another touch panel according to the first embodiment.

As illustrated in FIG. 9, the conductive part 80 may be formed on the transparent conductive film 40 of the lower electrode substrate 20, and another conductive part 88 may be formed on (i.e., beneath) the transparent conductive film 30 of the upper electrode substrate 10 at the position directly above the conductive part 80.

The conductive part 80 and the conductive part 88 may preferably be formed in the area where the decorative area 72 is provided so as to be concealed by the decorative area 72, i.e., in the area under the decorative area 72.

Figure 10:
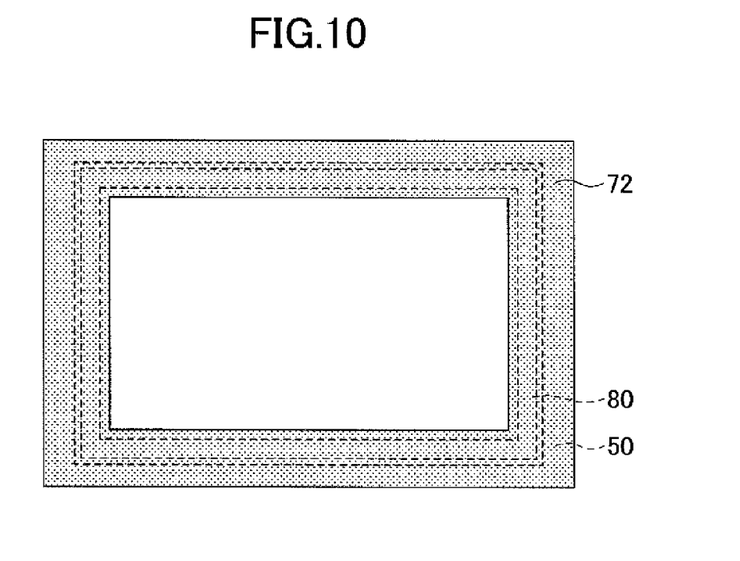
FIG. 10 is an illustrative drawing of a touch panel according to the first embodiment.

As illustrated in FIG. 10, the conductive part 80 may be provided along the four sides of the display panel in the area where the decorative area 72 is formed. The provision of the conductive part 80 at such position makes it possible for the decorative area 72 to conceal the conductive part 80, thereby avoiding the loss of aesthetic appearance of the touch panel.

Figure 11:
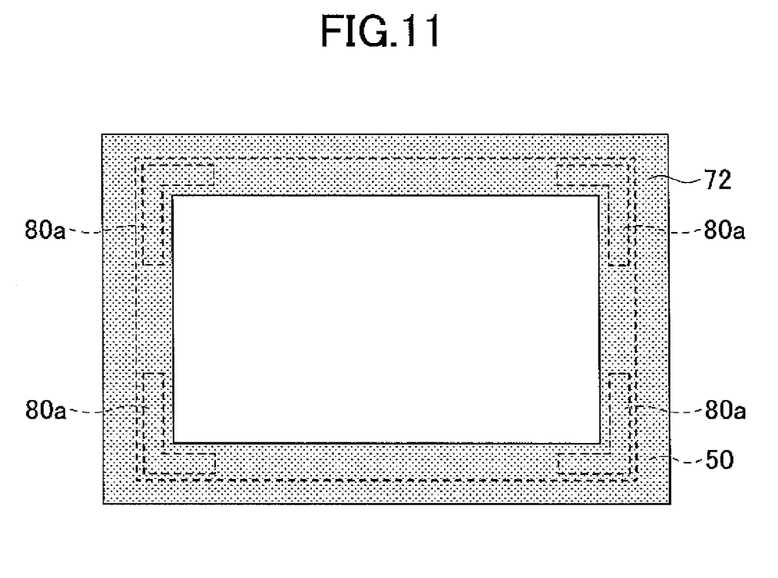
FIG. 11 is an illustrative drawing of another touch panel according to the first embodiment.

As illustrated in FIG. 11, instead of the conductive part 80, conductive parts 80a each having an L-letter shape may be provided at the four corners of the touch panel. The four corners of the touch panel are the points at which the spacer 50 of one side and the spacer 50 of another side intersect with each other, so that the upper electrode substrate 10 is hard to warp at these corners. The provision of the conductive part 80a at the four corners of the touch panel makes it easier to establish an electrical connection near these corners.

Figure 12:
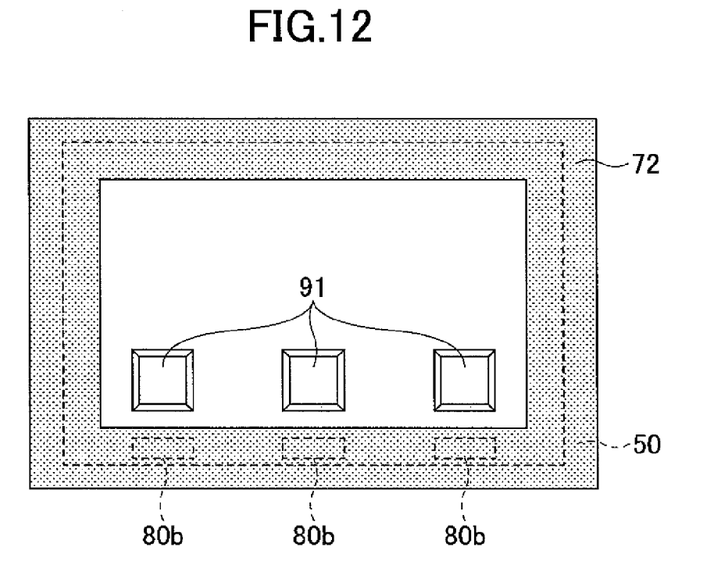
FIG. 12 is an illustrative drawing of yet another touch panel according to the first embodiment.

As illustrated in FIG. 12, conductive parts 80b may be provided in the vicinity of display areas 91 that indicate the places where pressing by a finger or the like may occur, i.e., in the area where the decorative area 72 closest to the display areas 91 is formed. In this case, since information is entered into the touch panel at the display areas 91, the provision of the conductive parts 80b near the display areas 91 suffices to achieve proper inputting of information at the display areas 91. Further, erroneous inputting may be reduced. The display areas 91 may be provided by the decorative film 70, or may be displayed on the display screen of the display apparatus 90 illustrated in FIG. 4, for example.

[Second Embodiment]

In the following, a second embodiment will be described. The touch panel of the second embodiment is directed to a configuration in which a conductive part is provided on (i.e., beneath) the upper electrode substrate 10.

Figure 13:
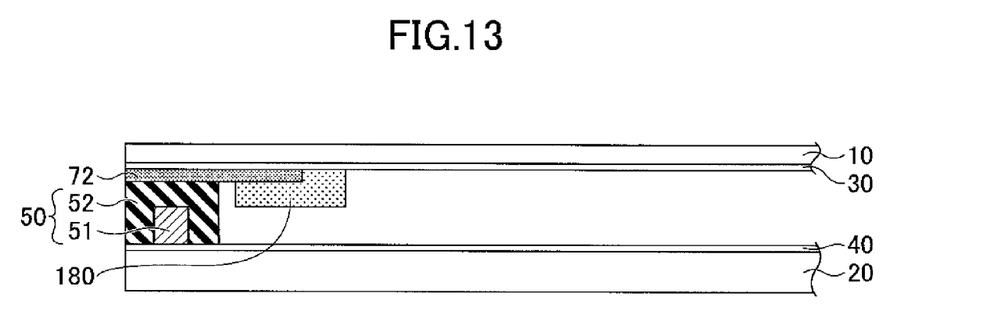
FIG. 13 is a drawing illustrating the structure of a touch panel according to a second embodiment.

In the touch panel of the present embodiment illustrated in FIG. 13, the decorative area 72 is formed on the surface of the upper electrode substrate 10 on which the transparent conductive film 30 is formed. A conductive part 180 is formed on the decorative area 72 or formed both on the decorative area 72 and on the transparent conductive film 30 on the inner side of the decorative area 72. The conductive part 180 is formed of a transparent conductive material or colored conductive material. As long as the conductive part 180 is situated near the area where the spacer 50 is provided, the same or similar advantages may be obtained regardless of whether the conductive part 180 is disposed on the upper electrode substrate 10 or on the lower electrode substrate 20.

Figure 14:
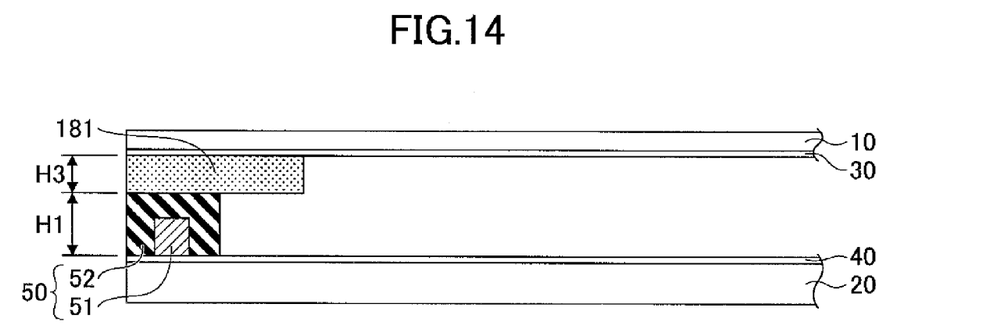
FIG. 14 is a drawing illustrating the structure of another touch panel according to the second embodiment.

In the touch panel of the present embodiment, the decorative area may be formed of a conductive part 181 as illustrated in FIG. 14. In this case, the conductive part 181 is formed of a colored conductive material such as carbon black paste. Since there is no need to form a dedicated decorative area, the touch panel having this configuration can be manufactured at low cost. In the touch panel having this configuration, a height H3 of the conductive part 181 may preferably be the same as the height H1 of the spacer 50 or larger than the height H1 of the spacer 50. The height H3 of the conductive part 181 may be in a range of 20 micrometers to 40 micrometers, and the height H1 of the spacer 50 may be in a range of 20 micrometers to 40 micrometers.

Further, the present invention is not limited to these embodiments, but various variations and modifications may be made without departing from the scope of the present invention.

The present application is based on Japanese priority application No. 2011-000163 filed on Jan. 4, 2011, with the Japanese Patent Office, the entire contents of which are hereby incorporated by reference.

What is claimed is:

1. A touch panel, comprising:
an upper electrode substrate having an upper conductive film formed thereon;
a lower electrode substrate having a lower conductive film formed thereon, the upper conductive film and the lower conductive film being arranged to face each other;
a spacer disposed between the upper conductive film and the lower conductive film along four sides of the upper electrode substrate and the lower electrode substrate; and
a conductive part disposed on the lower conductive film, the conductive part projecting toward the upper conductive film, a projecting end of the conductive part facing the upper conductive film with a gap therebetween,
wherein upon application of pressure, the conductive part comes in electrical contact with the upper conductive film,
wherein the conductive part includes an insulating part formed on the lower conductive film and a metal layer covering the insulating part, and
wherein the spacer includes an insulating portion and a conducting portion, the conducting portion being disposed on the lower conductive film and being covered by the insulation portion so as to be insulated from the upper conductive film, the conducting portion of the spacer being separate and spaced apart from the conductive part, and both the conducting portion of the spacer and the conductive part having the frame shape being directly attached on a same continuous area of the lower conductive film.

2. A touch panel, comprising:
an upper electrode substrate having an upper conductive film formed thereon;
a lower electrode substrate having a lower conductive film formed thereon, the upper conductive film and the lower conductive film being arranged to face each other;
a spacer disposed between the upper electrode substrate and the lower electrode substrate along four sides of the upper electrode substrate;
a decorative layer disposed between the upper conductive film and the spacer, the decorative layer having a frame shape extending along the four sides of the upper electrode substrate; and
a conductive part disposed both under the decorative layer and under an inner area of the frame shape of the decorative layer such that the conductive part is in physical contact with the upper conductive film in the inner area of the frame shape.

* * * * *